Patented Mar. 17, 1931

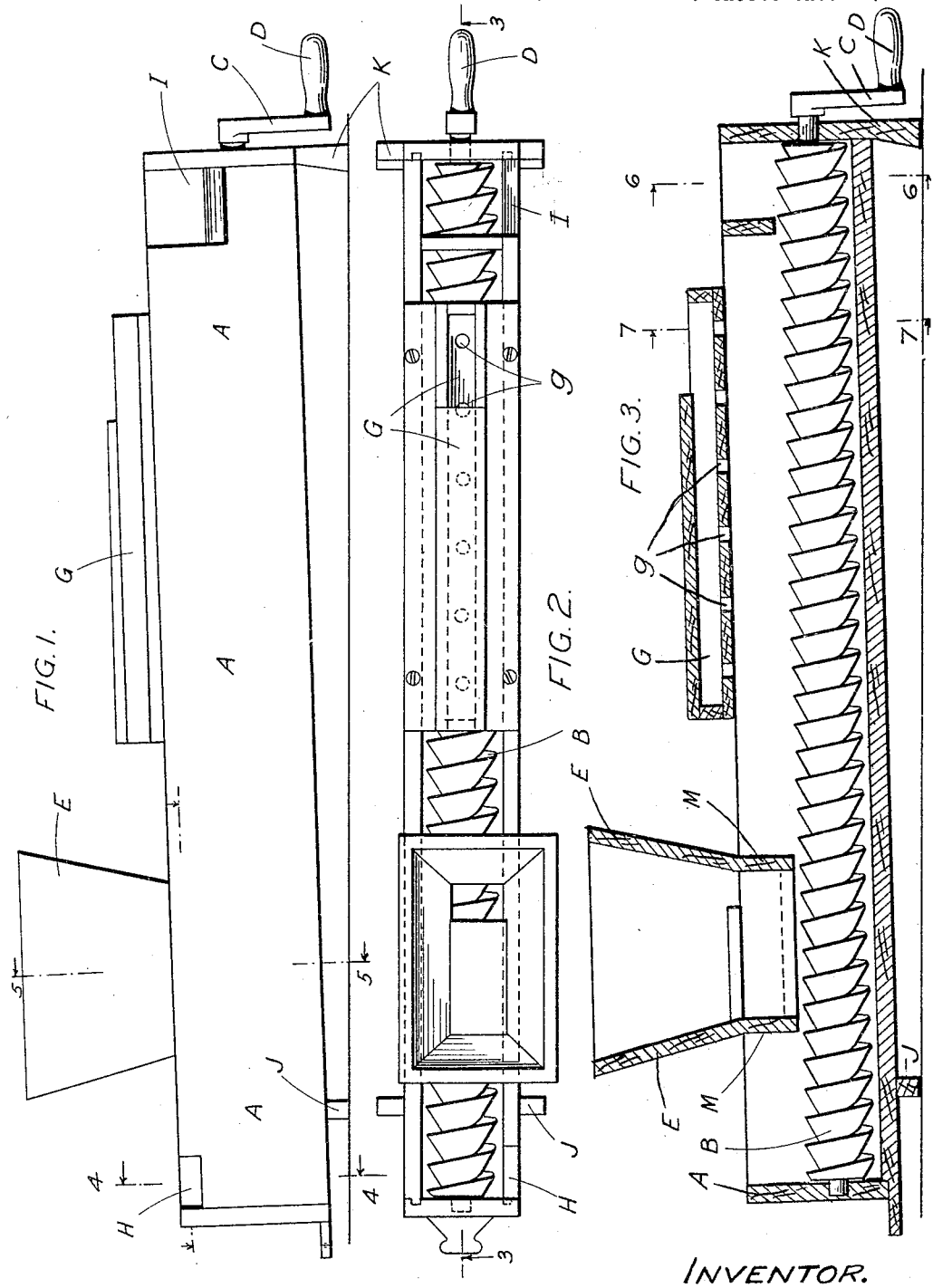

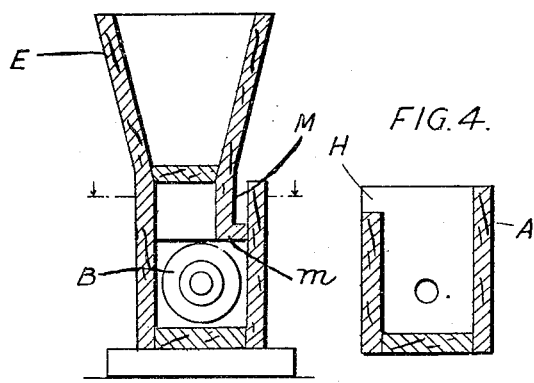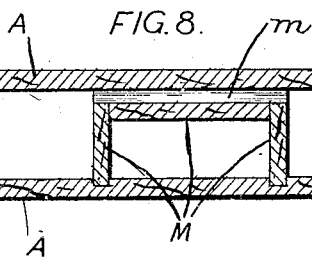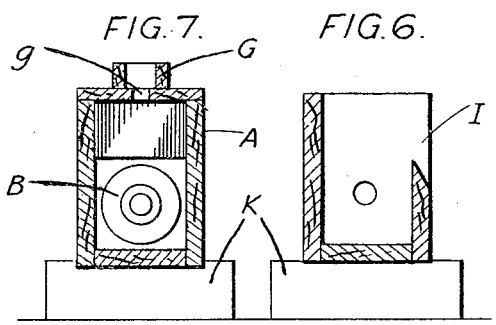

1,796,856

UNITED STATES PATENT OFFICE

MAX AYA, OF LONDON, ENGLAND

METHOD AND MEANS FOR WASHING COFFEE BEANS

Application filed March 31, 1928, Serial No. 266,249, and in Great Britain February 15, 1928.

This invention refers to a new or improved method of and means for washing coffee beans or for similar purposes e. g. for washing any other beans, or berries, seeds, grain or the like.

The method of washing coffee beans, or other beans or berries, seeds, grain or the like, according to the present invention is effected by counterflow action.

According to my invention the beans etc. to be washed are submerged in water and are stirred therein and caused to travel in one direction and at same time are caused to slowly ascend, while the water employed for washing said beans etc. is caused to travel in the opposite direction until discharged at a lower level together with the waste etc. carried in said wash water.

An apparatus or machine for washing coffee beans, or for similar purposes, according to my invention is illustrated in the accompanying drawings, in which:—

Fig. 1 is a longitudinal side view of the apparatus in elevation.

Fig. 2 is a plan view of Fig. 1.

Fig. 3 is a longitudinal vertical sectional view on the line 3—3 Fig. 2.

Fig. 4 is a transverse vertical section of the apparatus on the line 4—4 Fig. 1.

Fig. 5 is a transverse vertical section of the apparatus on the line 5—5 Fig. 1.

Figs. 6 and 7 are transverse vertical sectional views respectively on lines 6—6 and 7—7 of Fig. 3.

Fig. 8 is a local sectional plan view on line 8—8 Fig. 2.

I employ an elongated chamber, box, or tunnel A, which I will hereinafter refer to as the "main box"; the bottom of which main box A is arranged or mounted on an incline; and in this main box A of elongate form I arrange and mount a revolvable screw (such for example as an Archimedean screw) B; or I may employ a series of blades or paddles or arms arranged and mounted in a spiral form on a revolvable shaft by which such spirally arranged blades or arms can be revolved; and such revolvable screw or spirally arranged blades or arms on a revolvable shaft I will hereinafter refer to as the "screw" B.

Along each side of said screw B, I provide the necessary space between same and the side wall of the main box A proportional to the size of the beans, etc. to be washed.

As illustrated, this screw B extends the whole length of the main box A and is journalled at each end therein; or if desired the screw B may extend for only part of the length of the main box A and may be journalled or mounted in any suitable bearings or supports at or towards each end or may simply rest at one end or along any part of its length on the bottom of the main box A.

The screw may be revolved by any suitable means; e. g. it may be hand operated by the crank C and crank handle D or it may be driven from any suitable source of power.

The dimensions of the said main box A may vary according to the description of the beans or seeds etc. to be washed; e. g. for washing coffee beans, the following dimensions may be employed:—

(a) The length of the box A may be 180 centimetres.

(b) The depth of the box A may be 30 centimetres.

(c) The width of the box A may be 6 centimetres.

For washing rice:—

(a) The length of the box A may be 60 centimetres.

(b) The depth of the box A may be 10 centimetres.

(c) The width of the box A may be 6 centimetres.

Towards one end of the main box A (i. e. towards the lower end of the latter) is provided a hopper E leading into the main box; through which hopper E the beans (or the seeds etc.) to be washed are introduced into the main box A.

Means are provided for supplying water to the interior of said main box—between said hopper E and the higher end of said main box A; for example I may provide on or over said main box A a smaller box or conduit G to which water is supplied from any suitable source, and from this smaller box or conduit G the water is distributed through suitable openings g (or by other suitable means) into the interior of the main box A.

At or near each end of said main box A same is provided with openings H and I; through which opening H at the lower end the water with the waste material carried thereby can escape, while through the said opening I at the upper end the beans etc. can pass out after they have been washed.

Such opening at each end may advantageously be formed only in the upper part or top part of the main box A at each end e. g. by removing the top part of the side walls near the end, for a short distance along at each end.

This apparatus or machine may be inclined at any suitable angle to the horizontal; e. g. at an inclination of three per cent or thereabouts.

J and K are carriers on which the apparatus is supported; K being made considerably higher than the carrier J; i. e. K may be made of any suitable height so as to impart any desired inclination to the main box A.

In the arrangement illustrated; the bottom of the hopper E is supported on the frame M (see Figs. 3, 5 and 8) which is affixed inside the main box A; this frame M having the laterally extending flange m thereon (see Fig. 5) for attaching it to the side wall of the main box A inside the latter.

The operation of this apparatus or machine is as follows:—

The coffee beans or other seeds etc. (to be washed) are fed through the hopper E into the said elongate main box A and simultaneously water is supplied to the latter and the screw B revolved, whereby the coffee beans etc. are stirred by the rotation of said screw B and also caused to travel along the main box A—ascending as they travel—towards the higher end of said main box A where they are eventually discharged through the opening I aforesaid; while at the same time the water flows along said main box A towards the lower end of the latter and in the opposite direction to the travel of the beans etc. thereby washing the beans etc., and eventually this wash water is discharged through the aforesaid opening H at the lower end of the main box together with the waste etc. carried in said wash water.

What I claim is:—

Machine for washing coffee beans and other beans, berries, seeds and the like comprising a conveyor casing mounted on an incline, a conveyor screw revolvable in said casing and arranged to be submerged by the wash water therein, said conveyor screw having the diameter thereof, relatively to the width between the side walls of the conveyor casing, such that the beans or the like while undergoing washing cannot pass through the space or clearance left between, and will not be crushed between the said conveyor screw and the interior wall of the said casing, means for rotating said screw during the washing operation, a hopper arranged on said casing towards the lower end thereof for feeding the beans to be washed into said casing towards the lower end thereof, means for delivering a supply of water into said casing between the hopper and the higher end of said casing, an opening in the top part of the side at the higher end of said casing for discharging the washed beans at this higher end, and an opening in the top part of the wall at the lower end of said casing for discharging the wash water and waste etc. carried thereby.

MAX AYA.